T. H. GRIFFITH.
BED.
APPLICATION FILED JAN. 31, 1919.
1,385,045.
Patented July 19, 1921.
2 SHEETS—SHEET 1.
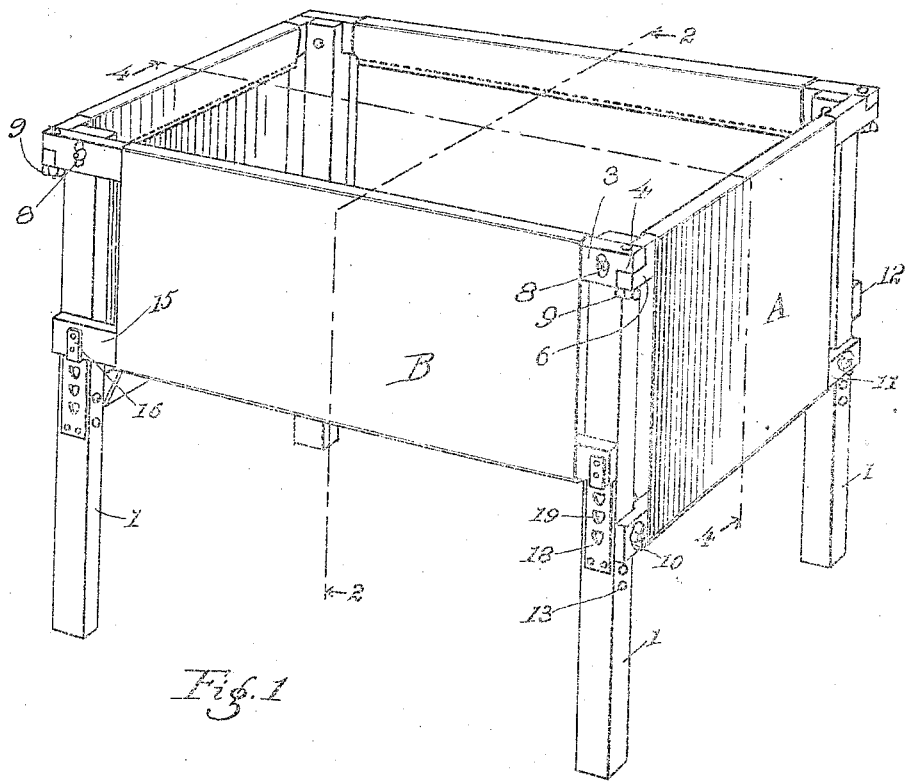
Fig.1.
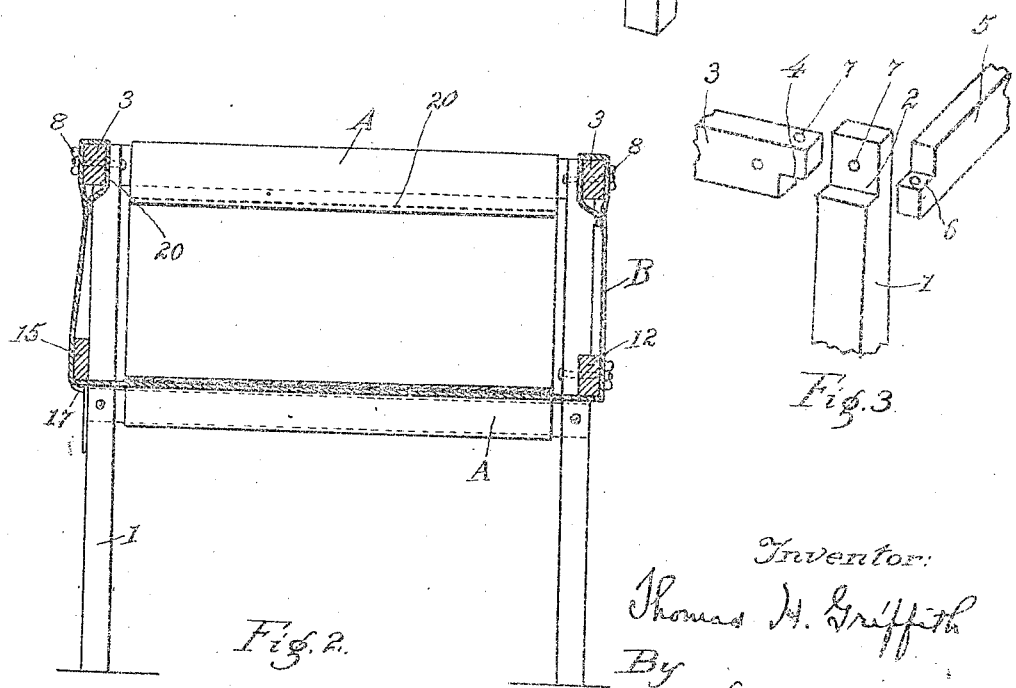
Fig.2.
Fig.3.
Inventor:
Thomas H. Griffith
By
Allen & Allen
Attorneys.

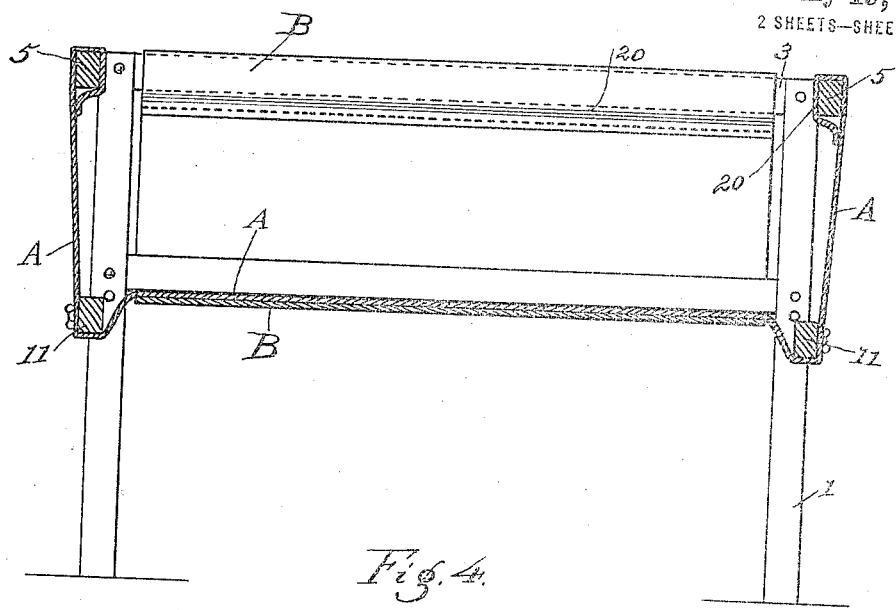
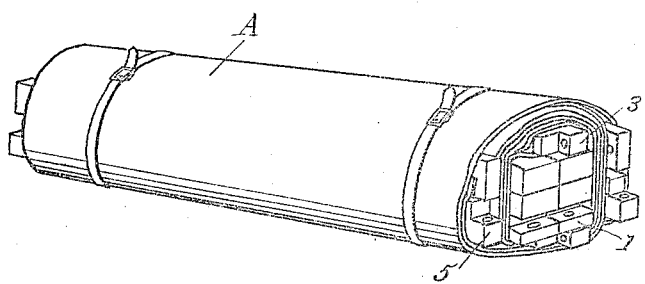
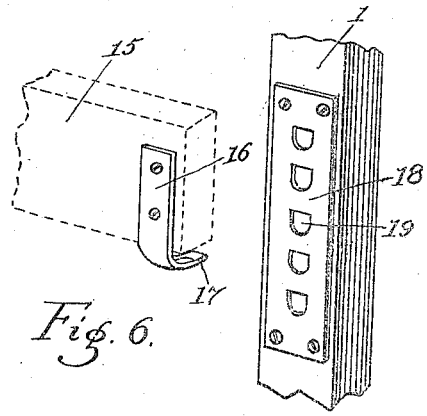

UNITED STATES PATENT OFFICE.

THOMAS H. GRIFFITH, OF CINCINNATI, OHIO.

BED.

1,385,045.

Specification of Letters Patent.

Patented July 19, 1921.

Application filed January 31, 1919. Serial No. 274,359.

*To all whom it may concern:*

Be it known that I, THOMAS H. GRIFFITH, a citizen of the United States, and a resident of Cincinnati, in the county of Hamilton and State of Ohio, have invented certain new and useful Improvements in Beds, of which the following is a full, clear, and exact description, reference being had to the accompanying drawings, forming part of this specification.

My invention relates to beds principally for infants, and has as its chief object the provision of a baby's bed which can be easily taken apart, folded up and carried from one place to another. Further objects are to provide a very inexpensive construction, employing canvas, duck or netting for the sides and bottom of the bed, and arranging the parts so that the proper tautness of the body may be readily maintained.

The above objects and other advantages which will be noted I accomplish by that certain construction and arrangement of parts to be hereinafter more specifically pointed out and claimed.

In the drawings,

Figure 1 is a perspective view of the bed complete.

Fig. 2 is a section of the bed taken on the line 2, 2, of Fig. 1.

Fig. 3 is a perspective detail of the shoulder at the corners of the bed frame.

Fig. 4 is a vertical longitudinal section through the bed, on the line 4, 4, of Fig. 1.

Fig. 5 is a perspective of the bed knocked down and ready for transportation.

Fig. 6 is a perspective detail of the adjustable mounting means for the movable base bar of the bed frame which takes up the slack in the canvas body thereof.

The frame of the bed is made up of four corner posts 1, which are cut to form shoulders at 2. The side bars 3, 3, are shouldered at 4, and the end bars 5 are shouldered at 6. As shown in Fig. 3, these dovetails are arranged so that the side bars seat on the corner posts and the end bars seat from beneath on the side bars whose ends protrude for that purpose. Bolt holes 7 are bored in the ends of these various pieces to receive wing bolts 8 (for the side bars) and 9 (for the end bars).

The base bars of the frame are secured to the corner posts by suitable wing bolts 10 let into holes bored in the posts and the bars. There are the two end base bars 11, 11, and one fixed side bar 12. By providing a series of holes 13 in the corner posts for the securing bolts 10 for the end base bars, their position can be changed when necessary.

I have found that but one side base bar need be movable, although the movable side bar structure to be described may be applied to both sides. In the structure shown, the side base bar 12 is bolted to the corner posts. The movable bar 15 is provided on its ends with curved plates 16, which extend down below the movable bars and form a point or tongue 17. The corner posts are provided with slotted plates 18, the posts being bored out behind the slots. The tongues 17 then enter the slots 19, so that the bar is adjustably hung on the posts.

The purpose of the adjustable side base bar is to tighten the canvas bottom of the bed. As shown in the drawings, there are two pieces of canvas or duck, the long narrow piece A and the wider piece B. Both pieces are formed with loops 20 to fit over the upper bars. The piece A stretches from the one end top bar, down under the end base bars, and back up to the other end bar at the top. The piece B is secured to the two side bars and is brought down around the two side base bars underneath the piece A.

It can be observed that should the canvas bottom of the bed formed by the piece A and supported underneath by the piece B become slack, that the lowering of the movable side bar will correct the error. The lowering of the bar will increase the size of the frame over which the piece B is stretched, and makes the piece B quite taut.

It will be noted that the end bars at the base are positioned lower than the side bars, which brings the piece A after it is brought around the base bars, in an upward slant, thence across the piece B, thence down and around the other end bar and up to the top of the bed. The stretching of the piece B will thus provide the tautness that is necessary for taking up the slack of the bed. Should the side bars at the base of the bed get below the end bars, however, the end bars would have to be moved down further on the corner posts, which is provided for by the series of holes 13 formed in the posts for this purpose.

It can be seen that the bed can be taken apart by merely unscrewing the bolts and slipping the canvas off of the top bars. A neat bundle can be made of the parts as shown in Fig. 5, the canvas providing the binding for the rest of the parts.

While I have illustrated the framework of the bed as made of wood and shown a simple construction of tongues and grooves with bolts for securing the frame together, it will be understood, of course, that the framework may be made of metal suitably secured together for knockdown purposes, or other methods of securing the wooden frame together will readily suggest themselves.

Having thus described my invention, what I claim as new and desire to secure by Letters Patent, is:—

1. A bed comprising a frame of corner posts, an upper and lower set of bars at the sides and ends, flexible webbing stretched across the frame in two directions, one of the side bars of the lower set having an adjustable mounting means on the corner posts, for the purpose described.

2. A bed comprising a frame of corner posts, an upper and lower set of bars at the sides and ends mounted on said posts, flexible webbing stretched across the frame, the lower set of side bars located higher than the end bars, and means for adjustably mounting one of the side bars, for the purpose described.

3. A bed comprising a knockdown framework of corner posts, and an upper and lower set of bars, demountably secured thereto, two pieces of flexible webbing, one stretching around the bed endwise and one sidewise, said pieces having loops to slip over the top bars, and being brought down across the lower set of bars and thence back up at the opposite side, as and for the purpose described.

THOMAS H. GRIFFITH.